United States Patent
Donaldson et al.

(10) Patent No.: US 8,770,525 B2
(45) Date of Patent: Jul. 8, 2014

(54) HIGH DENSITY CABLE MANAGEMENT BRACKET

(75) Inventors: Christopher Donaldson, Greenville, SC (US); Ted Lichoulas, Simpsonville, SC (US); Lou Guzzo, Inman, SC (US)

(73) Assignee: AFL Telecommunications LLC, Spartansburg, SC (US)

( * ) Notice: Subject to any disclaimer, the term of this patent is extended or adjusted under 35 U.S.C. 154(b) by 0 days.

(21) Appl. No.: 13/386,304

(22) PCT Filed: Jul. 20, 2010

(86) PCT No.: PCT/US2010/042550
§ 371 (c)(1),
(2), (4) Date: May 8, 2012

(87) PCT Pub. No.: WO2011/011379
PCT Pub. Date: Jan. 27, 2011

(65) Prior Publication Data
US 2012/0223192 A1    Sep. 6, 2012

Related U.S. Application Data

(60) Provisional application No. 61/227,125, filed on Jul. 21, 2009.

(51) Int. Cl.
*F16L 3/22* (2006.01)

(52) U.S. Cl.
USPC ............ 248/68.1; 248/65; 248/73; 248/74.1; 174/68.1; 174/68.3; 174/72 A; 174/88 R; 174/70 C; 385/134; 385/135

(58) Field of Classification Search
USPC ............ 248/68, 65, 68.1, 73, 74.1; 174/68.1, 174/68.3, 72 A, 88 R, 70 C, 95; 385/134, 135
See application file for complete search history.

(56) References Cited

U.S. PATENT DOCUMENTS

| | | | | |
|---|---|---|---|---|
| 3,809,799 A | * | 5/1974 | Taylor | 174/68.3 |
| 5,640,482 A | * | 6/1997 | Barry et al. | 385/135 |
| 6,728,461 B1 | * | 4/2004 | Senatore et al. | 385/135 |
| 2002/0129959 A1 | * | 9/2002 | Petersen | 174/68.1 |
| 2007/0058917 A1 | * | 3/2007 | Frohlich | 385/135 |
| 2008/0042536 A1 | * | 2/2008 | Guzzo et al. | 312/350 |
| 2010/0054682 A1 | * | 3/2010 | Cooke et al. | 385/135 |
| 2010/0266237 A1 | * | 10/2010 | Holmberg et al. | 385/24 |

\* cited by examiner

*Primary Examiner* — Daniel J Troy
*Assistant Examiner* — Asha Puttaiah
(74) *Attorney, Agent, or Firm* — Sughrue Mion, PLLC

(57) ABSTRACT

A bracket for routing cables in a cable management system that has a mounting portion which is used to mount the bracket to the cable management system and is provided on a mounting end of the bracket. The bracket also has a holding portion that has a plurality of apertures which are to hold the cables. Each of the apertures are provided at a different distance from the mounting end of the bracket.

13 Claims, 8 Drawing Sheets

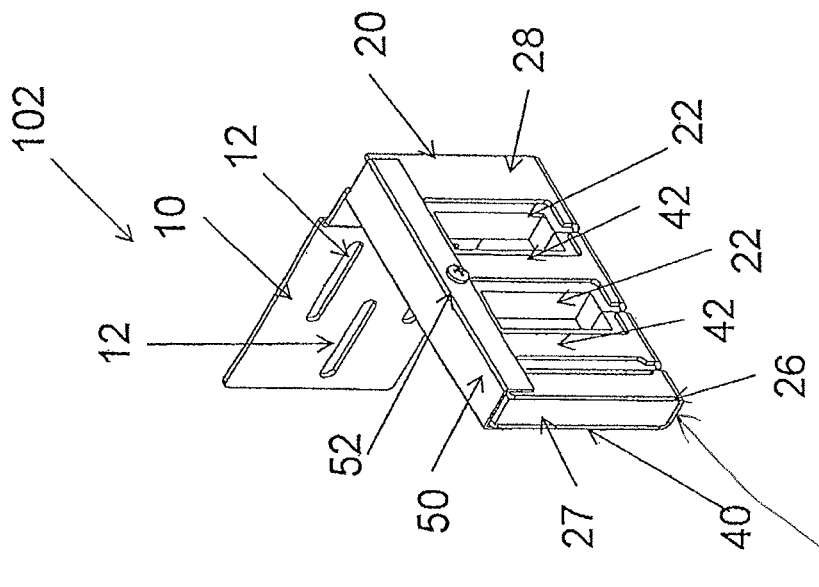
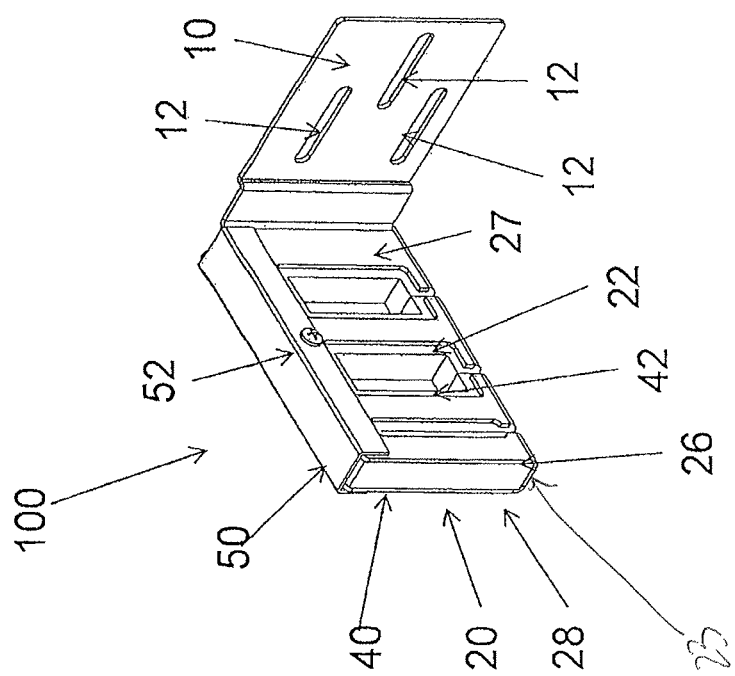
Figure 3a
Figure 3b

HIGH DENSITY CABLE MANAGEMENT BRACKET

CROSS-REFERENCE TO RELATED APPLICATIONS

This application claims the benefit of U.S. Provisional Application No. 61/227,125 filed Jul. 21, 2009. The entire disclosure of the prior application, U.S. Application No. 61/227,125, is hereby incorporated by reference.

BACKGROUND OF THE INVENTION

1. Field of the Invention

Apparatuses consistent with the present invention relate to brackets that route cables (such as fiber optic cables, telephone cables, coaxial cables, and Ethernet cables) and cable/fiber management systems on which the brackets are mounted.

2. Description of the Related Art

A cable/fiber management system connects terminating ends of cables, for example fiber optic cables. A cable/fiber management system has a panel bulkhead, and the connections between the cables are held by the panel bulkhead. The connections can use any termination method including fusing and mechanical splicing.

However, panel bulkheads of cable/fiber management systems are being made to hold an increasing number of connections, and it has become increasingly difficult to route cables in a manner which allows the cables to be easily identified and which allows the cables to be routed in a manner which minimizes bending and point of pressure losses. One current practice is to install routing rings on the upper or lower horizontal surface in front of the panel bulkhead and to add routing guides near ends of the panel bulkhead which will provide a fixed bend radius for the cables. However, this method makes it difficult to re-route cables held by the panel bulkhead. For example, the cables have to be tracked back through each routing ring in order to be re-routed. Additionally, since each routing ring holds many cables, the re-routing of one cable can cause inadvertent contact with other cables held by the panel bulkhead causing potential transmission problems.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any or all of the problems described above.

According to an aspect of the present invention, there is provided a bracket for routing cables in a cable management system including a mounting portion which is used to mount the bracket to the cable management system and is provided on a mounting end of the bracket, and a holding portion that has a plurality of apertures which are to hold the cables, wherein each of the apertures are provided at a different distance from the mounting end of the bracket.

By providing each of the apertures at a different distance from the mounting end of the bracket, the bracket has different levels which allow a panel user to route cables at the same level as they are held by the panel bulkhead. This feature allows the panel user to more readily determine which cables are routed to a particular portion of a panel bulkhead, and, if needed, remove or re-route cables with a lower risk of disrupting other cables. Additionally, the bracket minimizes bending and point of pressure losses.

BRIEF DESCRIPTION OF THE DRAWINGS

These and/or other aspects of the present invention will become apparent and more readily appreciated from the following description of the exemplary embodiments, taken in conjunction with the accompanying drawings, in which:

FIGS. 3A and 3B illustrate exemplary embodiments in which the retention members are provided inside the brackets;

DETAILED DESCRIPTION OF THE INVENTION

The following description of the illustrative, non-limiting embodiments discloses specific configurations, components, and processes. However, the embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various configurations, components, and processes of the embodiments that would have been known to one skilled in the art are omitted for the sake of clarity and brevity.

Figures 1A, 1B:
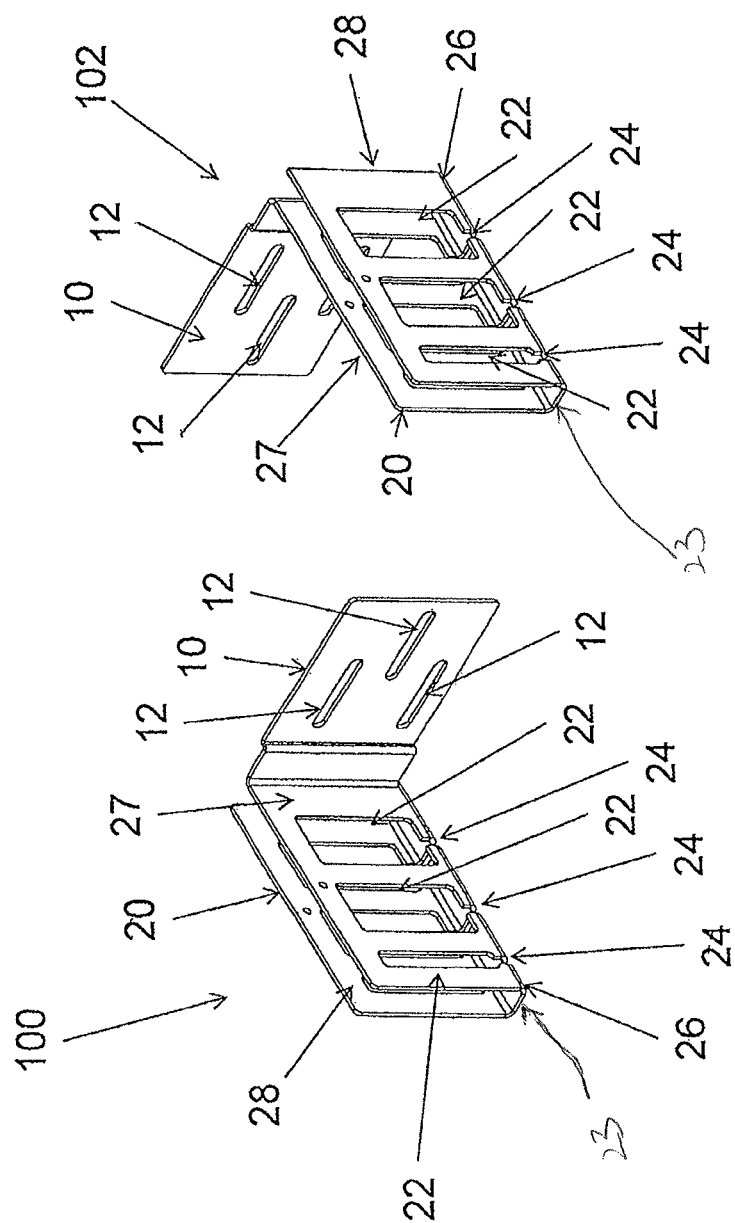
FIGS. 1A and 1B illustrate exemplary embodiments of brackets which are to be mounted to left and right ends of a cable management system.

FIG. 1A illustrates an exemplary embodiment of a bracket 100 which is to be mounted on a left end of a cable/fiber management system 200 (see FIG. 4), and FIG. 1B illustrates an exemplary embodiment of a bracket 102 which is to be mounted on a right end of a cable management system 200. The brackets 100 and 102 include mounting portions 10 which are used to mount the brackets 100 and 102 to the cable management system 200 and holding portions 20 which hold the cables 30 (see FIG. 4), which for example may be fiber optic cables, telephone cables, coaxial cables, or Ethernet cables. The mounting portions 10 extend approximately orthogonally to the holding portions 20.

Also, the mounting portions 10 have slots 12 formed therein which extend away from the holding portions 20. The slots 12 allow fixing members 14 (see FIG. 4) to be inserted through the slots 12 in order to fix the brackets 100 and 102 to the cable management system 200. The fixing members 14 may be screws, bolts, or the like. In this embodiment, each of the brackets 100 and 102 have three slots 12. However, one skilled in the art will recognize that more or less slots 12 could be used, and the invention is not limited to only three slots 12. Additionally, another mounting mechanism may be used without diverging from the invention.

Further, the holding portions 20 have a plurality of apertures 22 through with the cables 30 are to be inserted and held. Each of the apertures 22 are provided at a different distance from the mounting portion 10 which allows the cables 30 to be held at different levels in the vertical direction. Also, each of the apertures 22 have openings 24 located on a routing edge 26 and a base portion 23 of the holding portions 20 which communicate the apertures 22 with the outside. The openings 24 allow a middle portion 34 of a cable 30 to be inserted into an aperture 22 without having to thread an end portion 32 of the cable 30 through the aperture 22. While the present embodiment illustrates each bracket 100 and 102 having three apertures 22, one skilled in the art will recognize that more or less apertures 22 could be used, and the invention is not limited to only three apertures 22.

Additionally, the holding portions 20 of this embodiment are made into a general U-shape with the base portion 23 and legs 27 and 28. The general U-shape helps to hold the retention member 40, which is discussed later. However, one skilled in the art will recognize that the holding portions 20 do not have to have a general U-shape and do not have to hold a retention member 40. For example, the holding portions could be formed into a general V-shape or a flat plate, and the invention is not restricted to the brackets 100 and 102 having a general U-shape.

Figure 2:
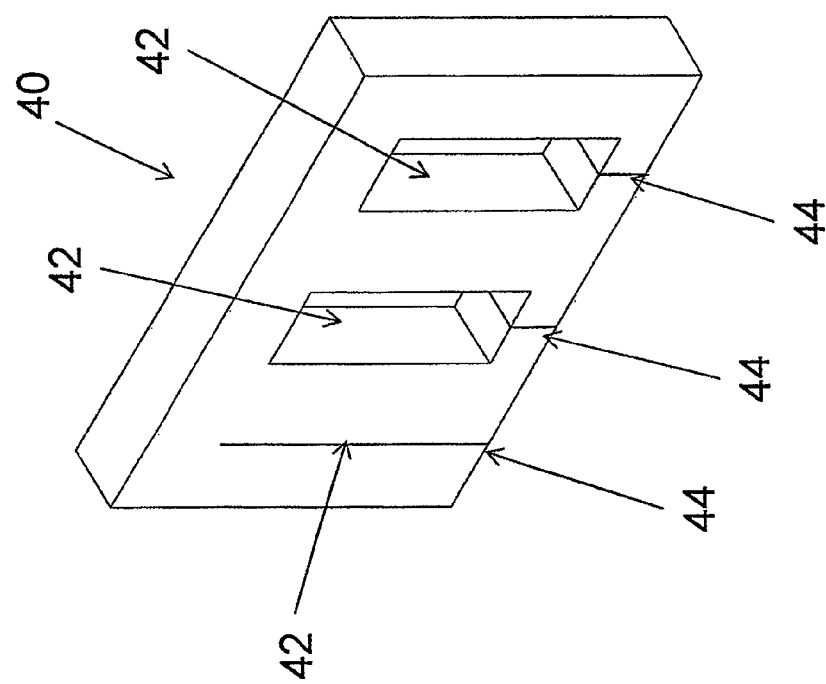
FIG. 2 illustrates an exemplary embodiment of a retention member.

FIG. 2 illustrates an exemplary embodiment of a retention member 40. The retention member 40 has a plurality of apertures 42 and openings 44 which correspond to the apertures 22 and openings 24 of the brackets 100 and 102. In the present embodiment, the retention member 40 has three apertures 42, but one skilled in the art will recognize that more or less apertures 42 could be used, and the invention is not limited to only three apertures 42.

The retention member 40 is made to fit inside either bracket 100 or 102 and provides for better retention and positioning of the cables 30. Specifically, friction between the cable jackets and the retention member 40 holds the cables 30 in place. This feature helps to fix the orientation in which the cables 30 are held by the panel bulkhead 210 of the cable management system 200 (see FIG. 4) which reduces cable bend and improves the overall appearance of the cable management system 200.

The retention member 40 can be made out of a foam such as a neoprene foam or a cellular urethane foam. Additionally, the retention member 40 can be made out of a natural or synthetic rubber. Preferably, the shore hardness O of the retention member 40 is between 10-50 durometers and more preferably 10-30 durometers.

FIG. 3A illustrates an exemplary embodiment in which retention member 40 is provided inside the bracket 100, and FIG. 3B illustrates an exemplary embodiment in which retention member 40 is provided inside the bracket 102. Specifically, the retention members 40 are sandwiched between the legs 27 and 28 of the holding portions 20. Covers 50 are mounted onto the holding portions 20 to cover the end portions of the legs 27 and 28 to ensure that the retention members 40 do not come out from between the legs 27 and 28. The covers 50 are mounted with the use of mounting members 52 which may be a screw, a bolt, or the like.

While the covers 50 are mounted to the holding portions 20 in this embodiment through the use of mounting members 52, one skilled in the art will recognize that the covers 50 could be mounted using a variety of techniques such as a snap fit or using adhesive, and the present invention is not limited to using mounting members 52. Additionally, one skilled in the art will recognize that the retention members 40 can be held inside the holding portions 20 without the use of covers 50 such as through the use of adhesive or forming the holding portions 20 to have a general O-shape, and the present invention is not limited to using covers 50 to hold the retention members 40.

Further, the retention members 40 are provided inside the holding portions 20 so that the apertures 42 of the retention members 40 are aligned with the apertures 22 of the holding portions 20. This allows for the cables 30 to be inserted into the apertures 22 and 42.

FIGS. 4-8 illustrate an exemplary embodiment of a cable/fiber management system 200 with the brackets 100 and 102 attached. The cable management system 200 has a housing 220 which has a top 222 and side walls 224 that cover the cable management system 200. Also, the side walls 224 define a width of the cable management system 200.

Figure 4:
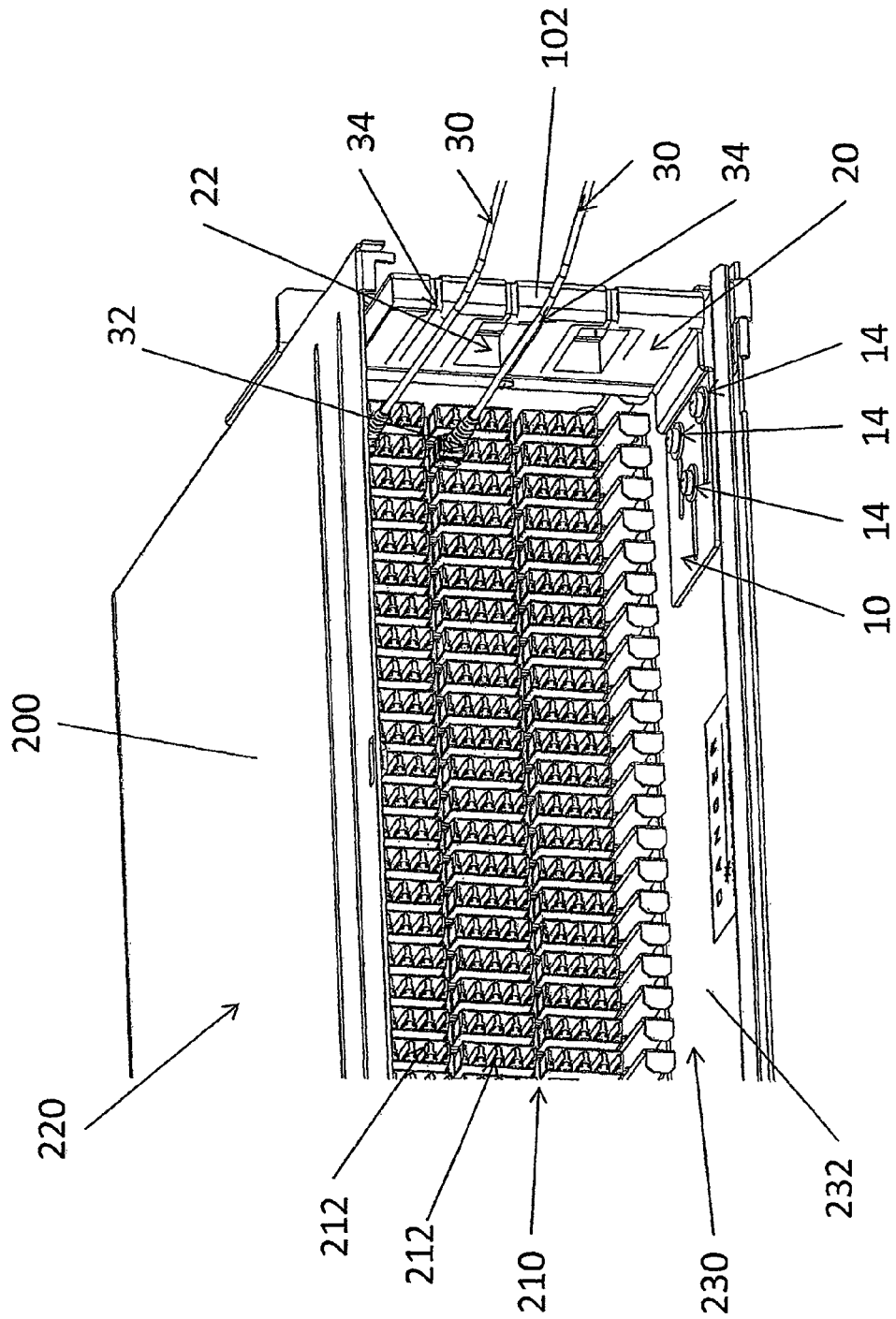
FIG. 4 illustrates an exemplary embodiment of a cable management system when the sliding internal tray is in the retracted tray position.
Figure 6:
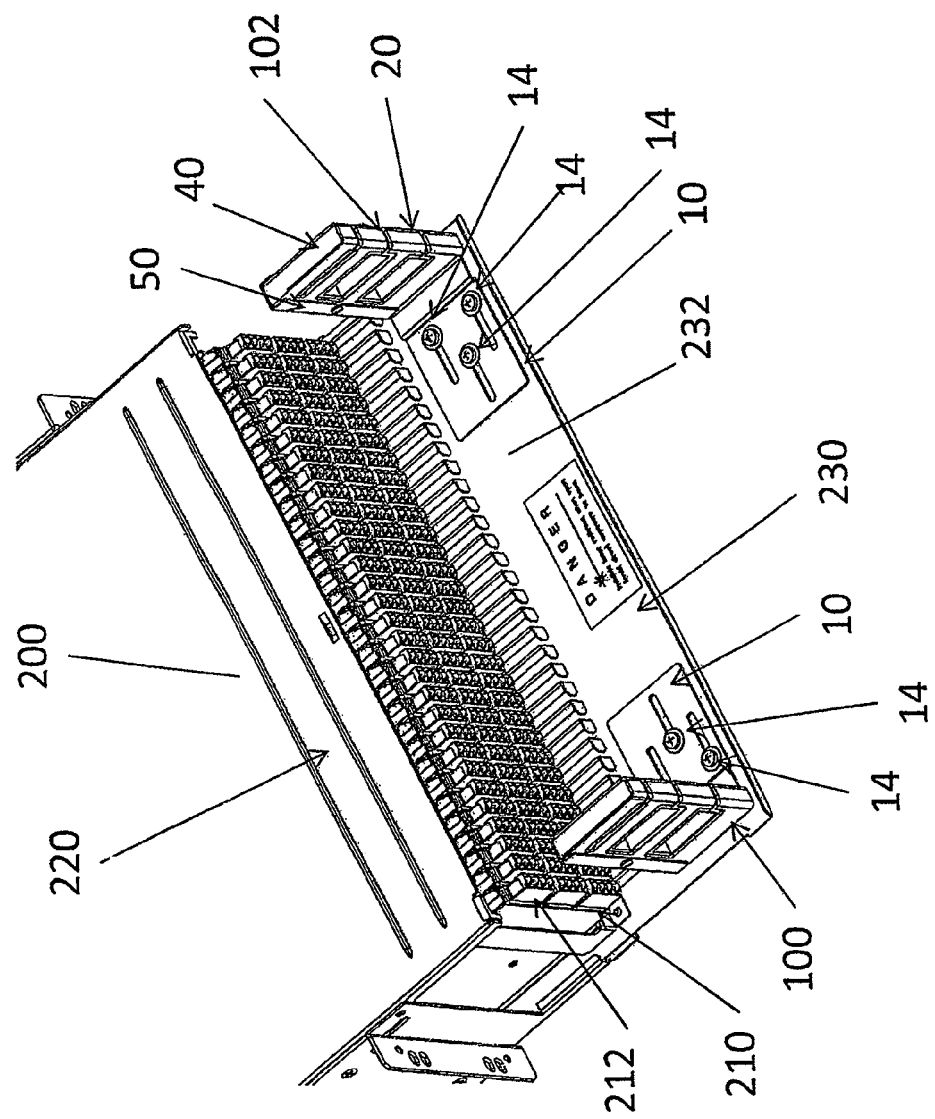
FIG. 6 illustrates the exemplary embodiment of FIG. 4 when the sliding internal tray is in the extended tray position.
Figure 7:
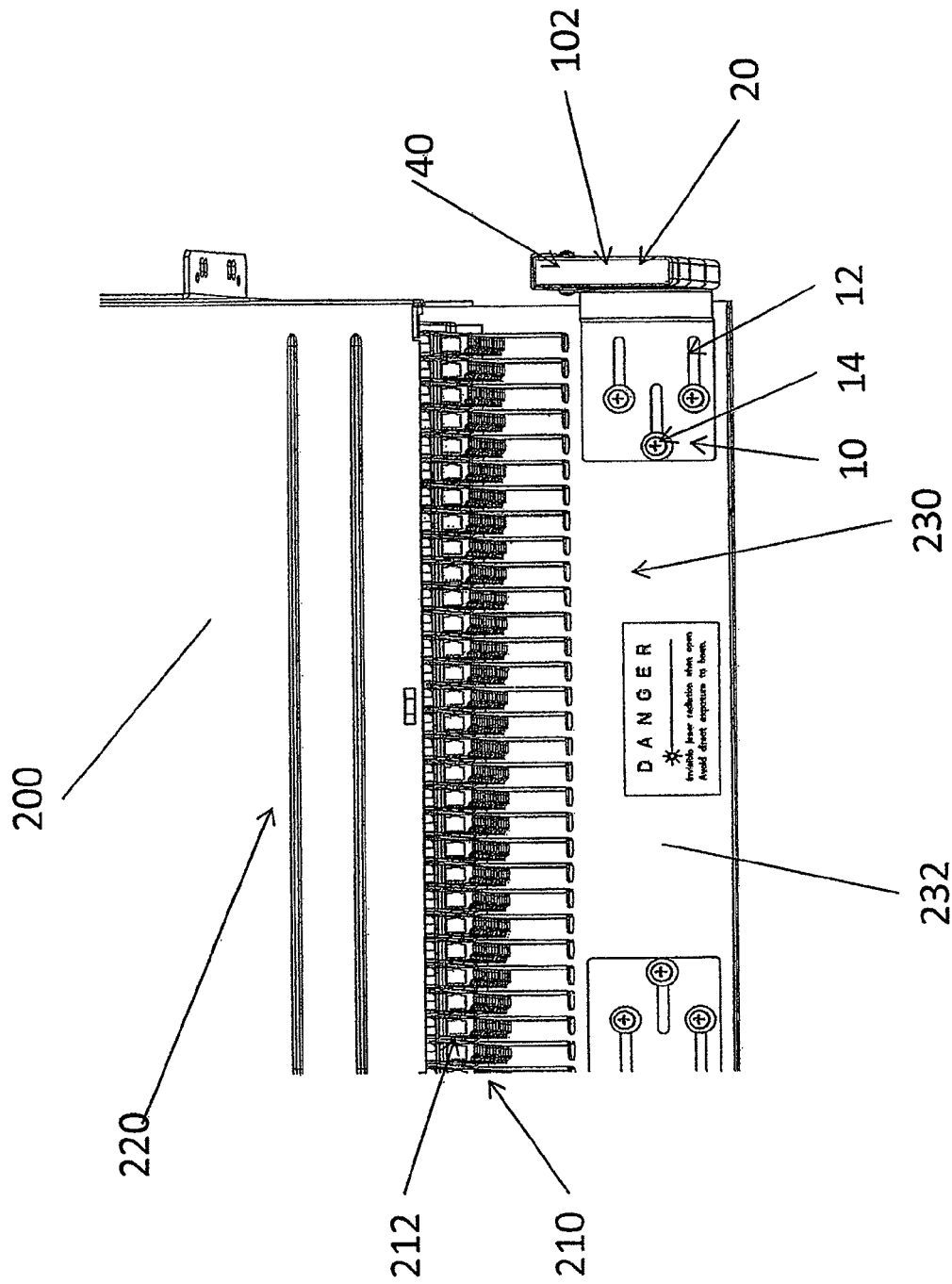
FIG. 7 illustrates an overhead view of FIG. 6.
Figure 8:
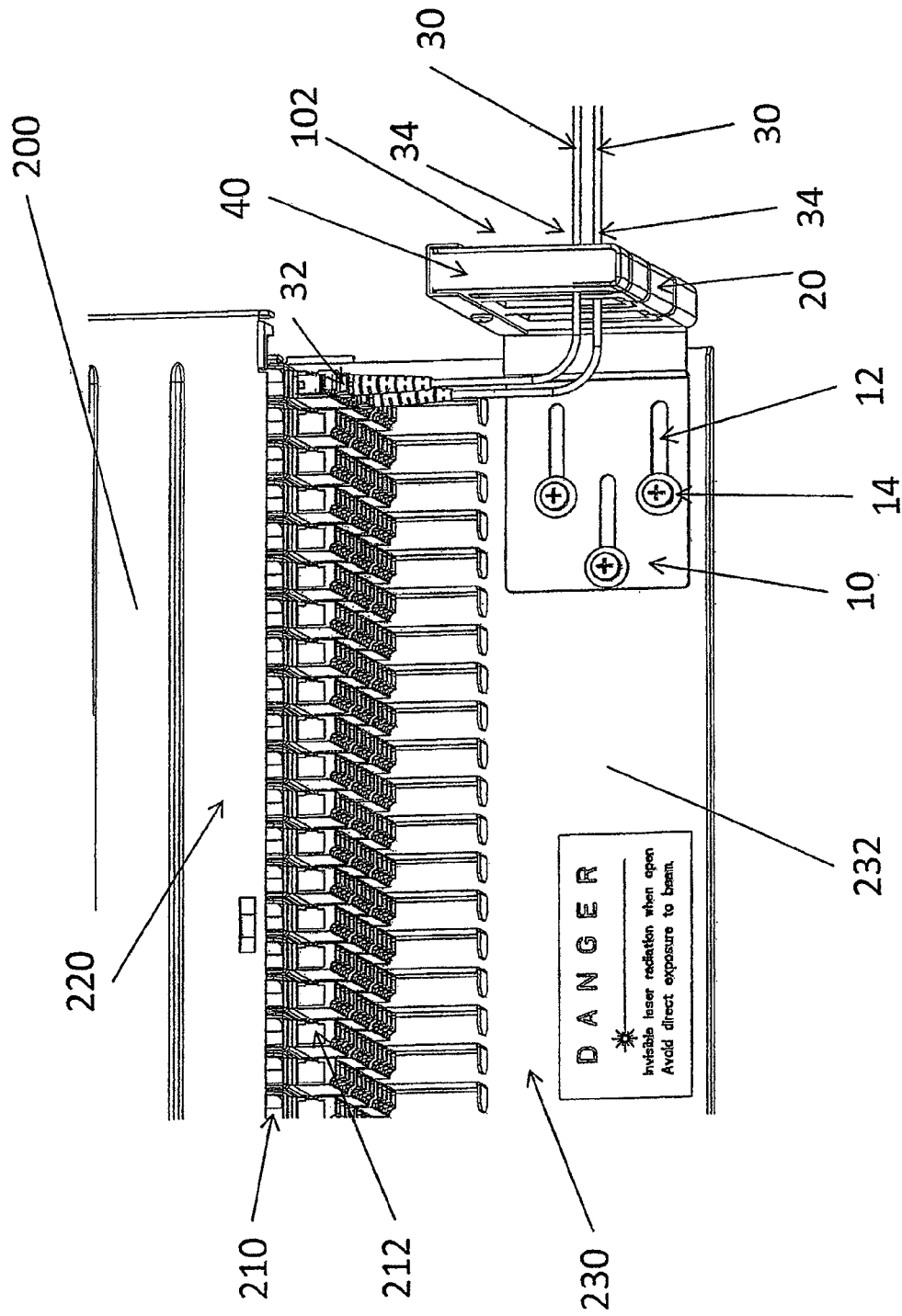
FIG. 8 illustrates the view of FIG. 7 with cables installed.

The cable management system 200 also has a panel bulkhead 210 which has a plurality of connection holders 212 which hold the connections between cables 30. The connections can use any termination method including fusing and mechanical splicing. In this embodiment, the panel bulkhead 210 is mounted to a sliding internal tray 230 which slides relative to the housing 220. FIG. 4 shows the sliding internal tray 230 in a retracted tray position, while FIGS. 6-8 show the sliding internal tray 230 in an extended tray position.

A shelf 232 is formed on the sliding internal tray 230 in front of the panel bulkhead 210. The brackets 100 and 102 are mounted on outer edges of the shelf 232. While this exemplary embodiment shows the cable management system 200 with a sliding internal tray 230, one skilled in the art will recognize that the cable management system 200 does not have to have the sliding internal tray 230, and the invention is not limited to having a sliding internal tray 230. Also, when a sliding internal tray 230 is not provided in the cable management system 200, the brackets 100 and 102 can be mounted to a horizontal surface which is provided in front of the panel bulkhead 210.

Also, in this embodiment, the brackets 100 and 102 are each mounted to the shelf 232 by passing three fixing members 14 through the slots 12. However, a person skilled in the art will readily recognize that there are other ways to mount the brackets 100 and 102 to the shelf 232, and the present invention is not limited to using three fixing members 14.

Figure 5:
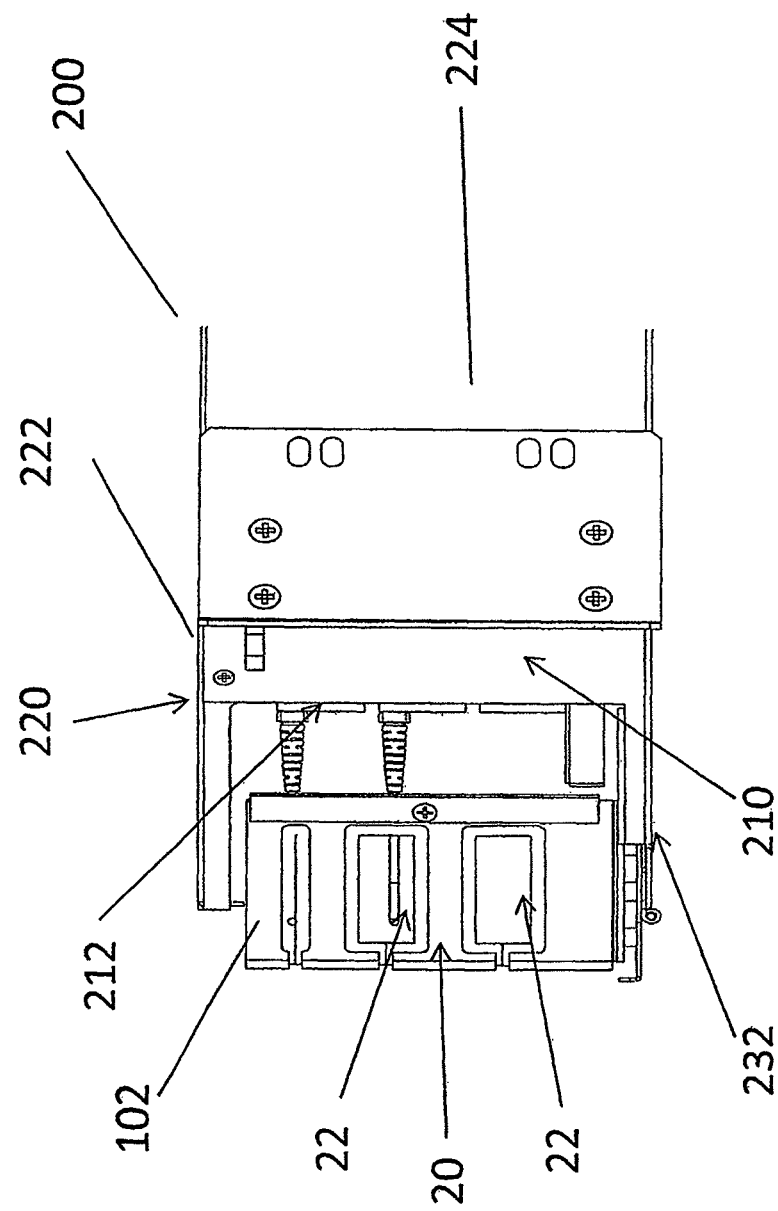
FIG. 5 illustrates a side view of the exemplary embodiment of FIG. 4.

The brackets 100 and 102 are able to be mounted to the shelf 232 in either an extended bracket position or a retracted bracket position. FIGS. 4-6 show the brackets 100 and 102 in the retracted bracket position, while FIGS. 7 and 8 show the brackets 100 and 102 in the extended bracket position. In order to change the bracket positions of the brackets 100 and 102, one positions the fixing members 14 at a different position relative to the slots 12. Further, when the brackets 100 and 102 are in the retracted bracket position, the brackets 100 and 102 are provided within the width of the cable management system 200 as defined by the side walls 224, while when the brackets 100 and 102 are in the extended bracket position, the brackets 100 and 102 have a portion which is provided outside the width of the cable management system 200.

Positioning a portion of the brackets 100 and 102 outside the width of the cable management system 200 allows for efficient utilization of all portions of the panel bulkhead 210. Specifically, if portions of the brackets 100 and 102 did not extend outside the width of the cable management system 200, then the cables 30 could not be held by outer edge portions of the panel bulkhead 210 because the cables 30 would have to be bent at a radius which is too small. Specifically, when the radius of a bend is too small, then there is high attenuation in the fiber optic cable. In contrast, when portions of the brackets 100 and 102 extend outside of the width of the cable management system 200, the cables 30 can be held by the outer edge portions of the panel bulkhead 210 because the bend radius necessary to place the cables 30 on the outer edge portions of the panel bulkhead 210 is much larger.

Also, FIG. 8 shows the cables 30 being held by the bracket 102 and installed to the panel bulkhead 210. One of the cables 30 is held by the upper aperture 22 while the other cable 30 is held by the middle aperture 22. Further, the cable 30 which is held by the upper aperture 22 is installed in an upper portion of the panel bulkhead 210, while the cable 30 which is held by the middle aperture 22 is installed in a middle portion of the panel bulkhead 210. Accordingly, a panel user can more easily determine which cables 30 are routed to a particular portion of the panel bulkhead 210 because the cables 30 can be held by the brackets 100 and 102 at the same level as they are installed in the panel bulkhead 210.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A one-piece bracket for routing cables in a cable management system comprising:
    a mounting portion which is slidably attached to the cable management system, having a first end and a second end, and is extending in a first direction; and
    a holding portion fixedly attached to the first end of the mounting portion and comprising a U-shaped portion having a base portion and a first leg and second leg connected to each end of the base portion, each of the first and second legs comprising a plurality of apertures configured to hold the cables, the U-shaped portion extending in a second direction substantially perpendicular from a plane extending in the first direction,
    wherein the base portion comprises a plurality of openings, each opening connecting each of the plurality of apertures of the first leg to it corresponding aperture of the second leg facing the each aperture of the first leg,
    wherein a width of the each aperture of the first and second legs in the second direction of the holding portion is different from a width of the each opening of the base portion in the second direction, and
    wherein each of the apertures of the first leg is provided at a different distance from the first end of the mounting plate in the first direction.

2. The bracket of claim 1,
    wherein the openings are disposed on a routing edge of the bracket which communicate the apertures to the outside, and
    wherein at least one of the apertures has a portion near the routing edge of the bracket which is narrower than a portion of the aperture which is located farther away from the routing edge.

3. The bracket of claim 1, wherein the plurality of apertures include at least three apertures.

4. The bracket of claim 1,
    wherein the mounting portion comprises at least one slot which extends away from the holding portion and allows a fixing member to be inserted there through.

5. The bracket of claim 4, wherein the at least one slot includes a plurality of slots.

6. The bracket of claim 1, wherein a retention member is sandwiched between the first and second legs of the holding portion, and
    wherein the retention member is configured to hold the cables using friction created between the retention member and the cables.

7. The bracket of claim 6, wherein the retention member comprises a foam or a rubber.

8. The bracket of claim 1, wherein the cable comprises fiber optic cables in a fiber management system.

9. The bracket of claim 1:
    wherein the cable management system comprises:
        a panel bulkhead configured to hold a plurality of connections between cables; and
        a housing which covers the panel bulkhead.

10. The bracket of claim 9, wherein the cable management system further comprises a sliding internal tray which slides relative to the housing,
    wherein the bracket is mounted to the sliding internal tray.

11. The bracket of claim 9,
    wherein the housing has a top and side walls;
    wherein the side walls define a width of the cable management system; and
    wherein the bracket is slidably attached to the sliding internal tray of the cable management system so as to have a portion of the bracket extend outside of the width of the cable management system.

12. The bracket of claim 9, wherein the one-piece bracket comprises a plurality of brackets mounted to the cable management system.

13. The bracket of claim 9, wherein the cable management system comprises a fiber management system, and
    wherein the panel bulkhead is configured to hold a plurality of connections between fiber optic cables.

* * * * *